United States Patent [19]

Fujisawa

[11] 4,405,931
[45] Sep. 20, 1983

[54] PEN TYPE MULTI-COLOR RECORDING DEVICE

[75] Inventor: Kyuichi Fujisawa, Tonan, Japan

[73] Assignee: Alps Electric Co., Ltd., Tokyo, Japan

[21] Appl. No.: 348,143

[22] Filed: Feb. 11, 1982

[30] Foreign Application Priority Data

Feb. 16, 1981 [JP] Japan .............................. 56-19221[U]

[51] Int. Cl.³ ...................... G01D 15/16; G01D 9/28
[52] U.S. Cl. ................................. 346/139 R; 346/49
[58] Field of Search ................... 346/136, 139, 49, 50

[56] References Cited

U.S. PATENT DOCUMENTS 2,778,711 1/1957 Fielden ........................... 346/139 C

FOREIGN PATENT DOCUMENTS 50-57258 5/1975 Japan .
52-98517 7/1977 Japan .

*Primary Examiner*—Donald A. Griffin
*Attorney, Agent, or Firm*—Guy W. Shoup; Gerard F. Dunne

[57] ABSTRACT

A pen type recording device for recording data in any of several colors has a carriage having a rotary drum and movable across the surface of the recording paper through a printing region and a pen-selecting region. The rotary drum carries a plurality of pens arranged on its periphery and cam means mounted on the rotary drum and provided with feed teeth adapted to engage a stationary projection in such a manner that when the carriage is in the printing region, the rotary drum cannot rotate and when the carriage is in the pen-selecting region, the drum can be rotated by reciprocating the carriage to bring a selected pen into printing position.

3 Claims, 11 Drawing Figures

PEN TYPE MULTI-COLOR RECORDING DEVICE

The present invention relates to a multi-color recording device suitable for use with an X-Y plotter, a graphic printer, an alphanumeric printer or the like, which has a plurality of pens each adapted to write in a respective color and a simple mechanism for selecting which of the pens is to be used.

A coventional multi-color recording device, for example, an X-Y plotter, will now be described with reference to FIGS. 1 and 2.

As shown in FIG. 1, a carriage 2 adapted to hold a single pen is mounted on a slide arm 1 so that the carriage 2 can slide in the direction X along the arm 1, and this slide arm 1 is arranged so that it can slide in the direction Y along a stationary arm 4. When a pen of a different color is to be used in this structure, the slide arm 1 and carriage 2 are driven to return the pen 3a held by the carriage 2 to a predetermined pen-holding portion of the stationary arm 4, and then, the slide arm 1 and carriage 2 are moved to hold another pen for example, a pen 3b on the carriage 2. In this structure, the above-mentioned operation of attaching and dismounting pens to the carriage 2 is indispensable, and the mechanism for performing this operation is complicated and control of this operation is difficult. Moreover, considerable space is necessary for this mechanism and it is very difficult to simplify the mechanism selecting the appropriate pen, and to reduce the size thereof.

As means for eliminating the foregoing disadvantage, there may be considered a device in which a slide arm 7 supporting a carriage 6 carrying a plurality of pens is moved in the direction Y along a stationary arm 8 while the carriage is movable in the direction X, as shown in FIG. 2. In this structure, the pen-changing operation is unnecessary, but in order to select a predetermined pen for writing on the paper surface, it is necessary to dispose respective driving sources, for example solenoids, for each pen in order to move it into contact with the recording paper, or to dispose a driving source common to the respective pens and means to select an appropriate pen. With such devices, however, it is difficult to reduce the size and weight of the carriage. Furthermore, since the positions of the pens on the carriage differ, it is necessary to arrange a special mechanism for controlling the carriage according to the position of the selected pen.

It is therefore a primary object of the present invention to provide a multi-color recording device in which the foregoing defects of the conventional devices are eliminated and the selection of a pen of the desired color is performed by utilizing a drive source for shifting a pen-loading carriage to simplify the structure and reduce the size thereof.

More specifically, in accordance with the present invention, there is provided a device for recording data in any of a plurality of colors, including a carriage having a rotary drum carrying a plurality of recording pens spaced around the periphery of the drum and capable of writing in respective colors. The carriage can be moved across the path of movement of a recording paper through a printing region opposite said recording paper and a pen-selecting region adjacent the printing region. Pen-selecting means are provided for rotating the drum when the carriage is in the pen-selecting region to bring a selected pen into a printing position and for holding the drum against rotation when the carriage is in the printing region. Means are also carried by the carriage for urging the pen in the printing position outward into contact with the recording paper.

The pen-selecting means includes a cam mounted for rotation with the drum and having a plurality of teeth engaged by a stationary projection during movement of the carriage in the pen-selecting region, whereby the drum can be rotated to bring a selected pen into the printing position by reciprocating the carriage within the pen-selecting region.

These other advantages and features of the present invention will become apparent in view of the following description of a preferred embodiment described with reference to the accompanying drawings, in which:

FIG. 3 through 11 illustrate one embodiment of the pen type multi-color recording device according to the present invention, in which:

FIG. 3 is a perspective view showing main portions of the device;

FIG. 4 is a side view of main portions illustrating the printing state thereof;

FIG. 5 is a view illustrating the rotation state of a rotary drum;

FIG. 6 is a view showing engaging means for determining the position of the rotary drum with respect to the rotation direction thereof;

FIGS. 7 and 8 are bottom and sectional views respectively illustrating the positional relation between the rotary drum and a locking member in the printing region;

FIGS. 9 and 10 are bottom and sectional views respectively illustrating the positional relation between the rotary drum and the locking member in the pen-selecting region; and FIG. 11 is a perspective view illustrating the locking member.

Figure 1:
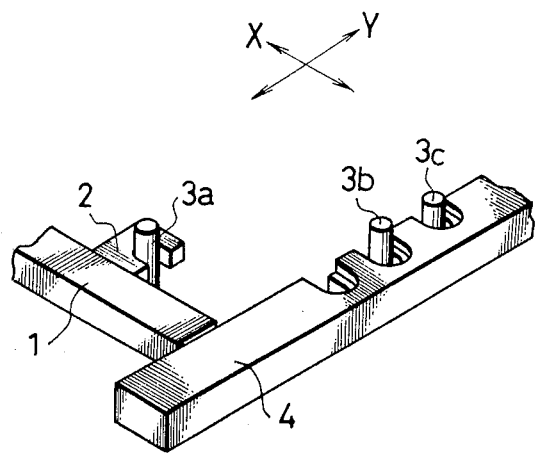
FIG. 1 is a diagram illustrating a conventional pen type multi-color recording device.
Figure 2:
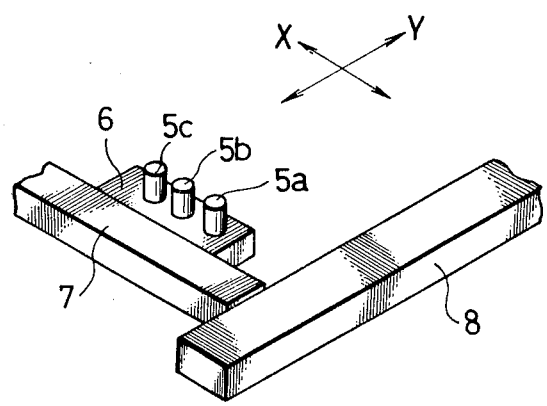
FIG. 2 is a diagram illustrating another conventional pen type multi-color recording device.

The present invention will now be described in detail with reference to an embodiment illustrated in FIGS. 3 through 11 of the accompanying drawings.

The embodiment illustrated in the drawings relates to a small graphic printer in which alphanumeric printing is possible. In the drawings, reference numerals 11 and 12 represent side frames of the printer, and a carriage 15 is mounted on two guide shafts 13 and 14 extending between the side frames 11 and 12 so that the carriage 15 can slide across the surface of a recording paper 16. The ends of a string 17 are connected to respective sides of the carriage 15 and guided by pulleys 18. The intermediate portion of the string 17 is wound on a pulse motor 19 rotating in normal and reverse directions. Namely, the carriage 15 is delivered on the guide shafts 13 and 14 according to the normal or reverse rotation of the pulse motor 19.

Reference numeral 21 represents a platen acting as a printing stand and also as a paper feed member, though the structure thereof is simplified in the drawings. A gear fixed to the end portion of a shaft 22 rotating integrally with the platen 21 is coupled with a driving gear 24 of a paper feed pulse motor 23 capable of rotation in both the normal and reverse directions through an appropriate intermediate gear. The recording paper 16 gripped between the platen 21 and an auxiliary roller 25 (see FIG. 4) elastically pressed to the platen 21 is delivered in a direction perpendicular to the movement of the carriage 15 by rotation of the pulse motor 23.

Figure 4:
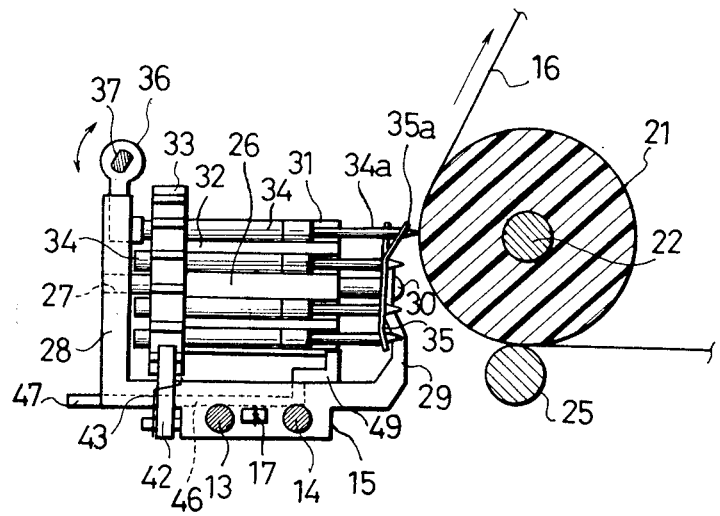
Figure 6:
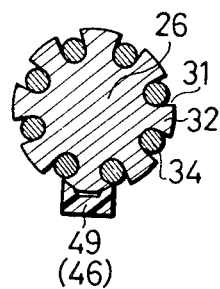

A rotary drum 26 formed of a sunthetic resin is arranged between a front side plate 28 and a rear side plate 29 of the carriage 15, and as shown in FIG. 4, a shaft 27 extending from the front side plate 28 is fitted into the center of the front face of the rotary drum 26, while a projecting shaft 30 extending from the center of the rear face of the rotary drum 26 is fitted in the rear side plate 29, whereby the rotary drum 26 is rotatably supported. As shown in FIG. 6, a plurality of grooves 31 are equidistantly formed in the periphery of the rotary drum 26 and these grooves each lie parallel to the axis of the rotary drum 26. Pen-holding projections 32 are formed on each side of each slide groove 31, and these pen-holding projections flare outwardly as shown to hold respective pens 34 in each groove 31. The pens 34 are inserted into respective grooves 31 so that the pens 34 can project outwardly of the drum 26 a predetermined distance, as shown in FIG. 4. Each of these pens 34 is formed of a light and inexpensive means, such as a refill of a ball-point pen or a fine-diameter felt pen imgregnated with a nonvolatile ink, and these pens 34 are capable of writing data differing in the color on the recording paper 16 by their pen points 34a.

A ratchet 33 or cam means is fixed to the front end of the rotary drum 26 or is formed integrally with the rotary drum 26, and has a number of teeth formed equidistantly around its periphery, with the number of teeth equalling the number of pens 34. In the embodiment illustrated in the accompanying drawings, the ratchet 33 is mounted on the end face of the rotary drum 26, but the ratchet 22 may be disposed on the peripheral face of the rotary drum 26. A spring plate 35 having a plurality of radial spokes 35a has the central portion thereof fixed to the projecting shaft 30 of the rotary drum 26, and each pen point 34a of the pens 34 is engaged by a respective spoke 35a and urged inwardly or to the left in FIG. 4. Incidentally, the pen points 34 extend through holes in the respective spokes 35a and when any of the pens 34 is pressed toward the recording paper 16 against the resiliency of the spoke 35a, the pen point 34a can be brought into contact with the recording paper 16.

Reference numeral 36 represents a hammer serving to press the pen outward and thus act as a push-out means. This hammer 36 is splined to a hammer shaft 37 so as to be slidable in the axial direction of the shaft but rotatable integrally therewith. The hammer shaft 37 is supported between the side frames 11 and 12. A part of the hammer 36 is always held within a groove 38 of the front side plate 28 of the carriage 15, and the hammer 36 is moved integrally with the carriage 15. The pressing face 36a of the hammer 36 is located at a position confronting only that pen 34 located at the printing position, as described below, and the hammer 36 presses the rear end of the pen 34 located at the printing position upon rotation of the hammer shaft 37, so that, as shown in FIG. 4, the pen 34 located at the printing position is pressed to the recording paper 16 against the resiliency of the spoke 35a. An electromagnetic plunger 39 or solenoid is disposed as a driving source of rotating the hammer shaft 37, and an end of the hammer shaft 37 is attached to a lever 40 attached to an operation rod 39a of the electromagnetic plunger 39. Incidentally, the operation rod 39a is always urged in outer position by means of a spring, not shown in the drawings, and when the electromagnetic plunger 39 is in the un-energized state, the hammer 36 is spaced from the rear end of the pen 34 in the printing position and when the electromagnetic plunger 39 is in the excited state, the hammer 36 presses the pen 34 in the printing position through the hammer shaft 37.

Accordingly, in the state where the electromagnetic plunger 39 is excited, that is, in the state where the pen point 34a of the pen in the printing position is brought in contact with the recording paper 16 under an appropriate contact pressure, the pulse motors 19 and 23 are driven pursuant to printing instructions to move the carriage 15 and/or the recording paper 16, whereby desirable letters, figures or patterns can be drawn on the recording paper 16.

Figure 5:
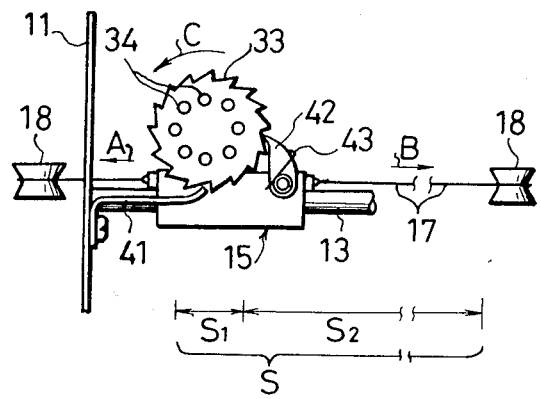

As shown in FIG. 5, the total moving distance S of the carriage 15 consists of a pen-selecting region S1 and a printing region S2. The printing region S2 is a region where the selected pen 34 confronts the recording paper 16, and in this printing region S2, the position of the rotary drum 26 is determined with respect to the rotation direction, and the data desired can be recorded in the above-mentioned manner. The pen-selecting region S1 is disposed in an area where the pens 34 do not confront the recording paper 16, and in this region S1, the rotary drum 26 is freely rotatable and the pen-selecting operation is performed by means described hereinafter.

The operation for determining the position of the rotary drum 26 and the pen-selecting operation will now be described.

As shown in FIGS. 7 through 10, a concave groove 44 having a predetermined length is formed in the center of the lower face of the carriage 15 along the axial direction of the rotary drum 26, and on the rear end, i.e. on the side close to the platen 21 of this groove 44, an angular hole 45 is formed which extends through the lower face of the carriage, and a locking member 46 is slidably inserted in the concave groove 44. This locking member 46 is shown in FIG. 11 and comprises a rod portion 47 held in the concave groove 44 of the carriage and having an end portion extending from the open end of the groove 44. An engaging portion 49 of the locking member 46 has a concave part 48 inserted in the hole 45 so as to extend upwardly lower face of the carriage 15 and engage a pen holding projection 32 of the rotary drum 26.

Figure 7:
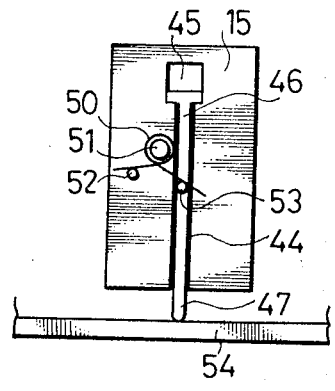
Figure 9:
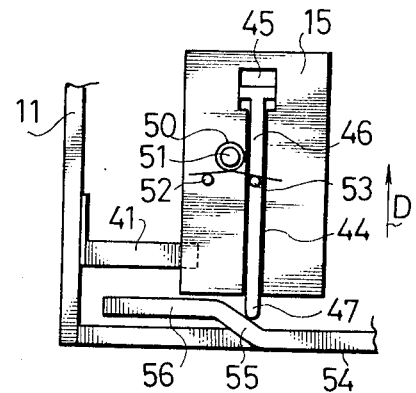
Figure 8:
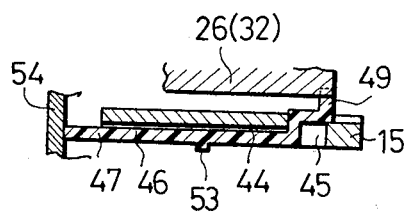

As shown in FIG. 7 and 9, a spring shaft 51 supporting a helical spring 50 thereon is arranged on the lower face of the lower panel of the carriage 15 in the vicinity of the above-mentioned concave groove 44, and one end of the helical spring 50 is resiliently connected with a supporting pin 52 extending from the carriage 15 and the other end of the helical spring 50 is resiliently connected with a supporting pin 53 extending from the rod portion 47 of the locking member 46. Accordingly, the locking member 46 is urged toward a front frame 54 of the printer by the resilient force of the spring 50, and with this movement, the end portion of the rod portion 47 of the locking member 46 is caused to slide on the inner face of the front frame 54. In the vicinity of the side frame 11 of the front frame 54, that is, in the pen-selecting region S1, as shown in FIG. 9, an engagement-releasing step portion 56 having a part 55 inclined toward the platen 21 of the printer is formed integrally with the front frame 54.

Figure 3:
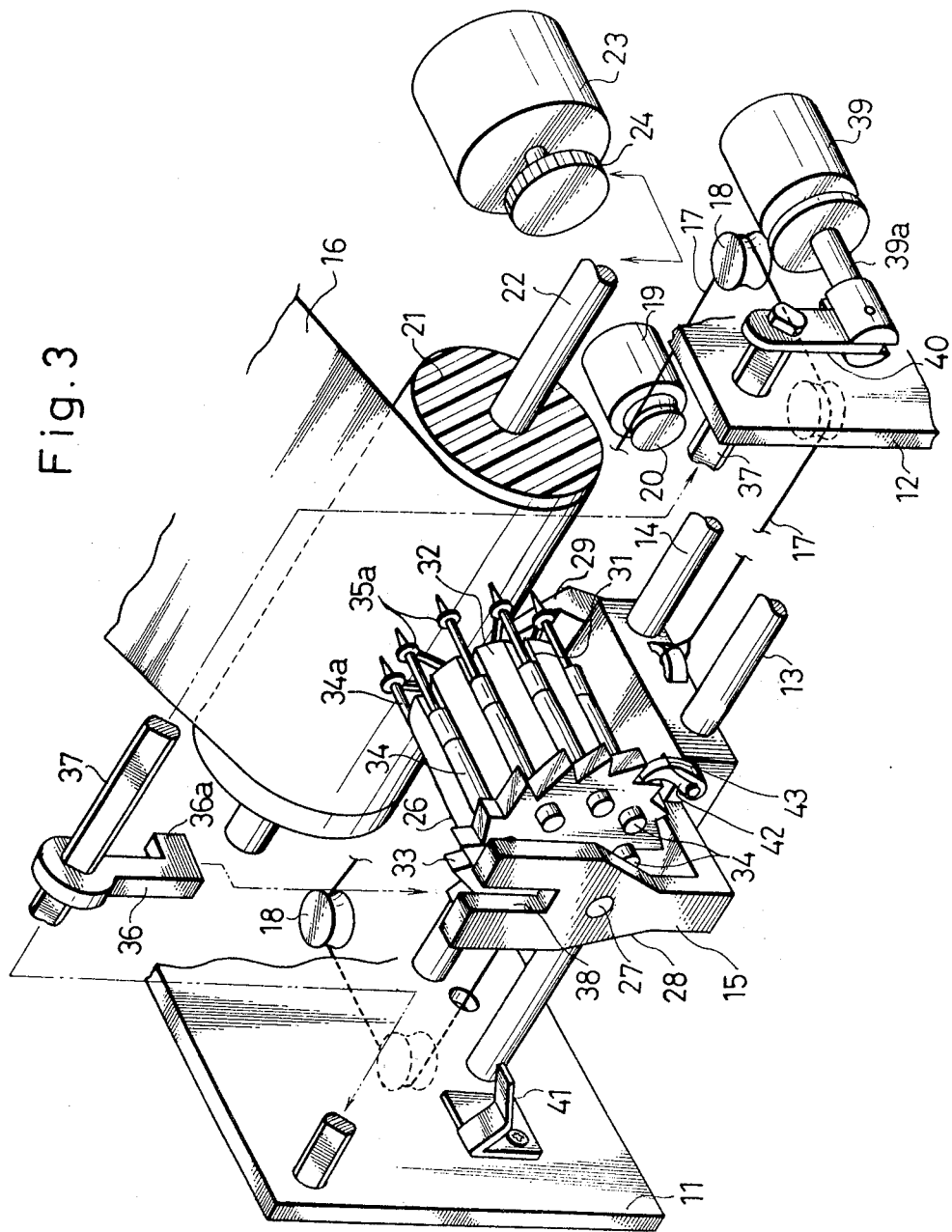

As shown in FIGS. 3, 5 and 9, a feed projection 41 consisting of a plate spring is attached to the inner face of the side frame 11 so that it can be brought into abutting contact with the ratchet 33 of the rotary drum 26.

In the printing region S2, it is necessary to inhibit rotation of the rotary drum after it has been rotated to a selected position and this is accomplished by inserting and fitting the engaging portion 49 of the locking member 46 around the appropriate pen holding projections 32 on the rotary drum 26, as shown in FIG. 6.

Figure 10:
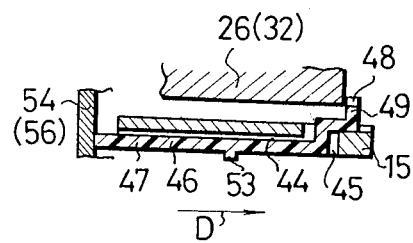
Figure 11:
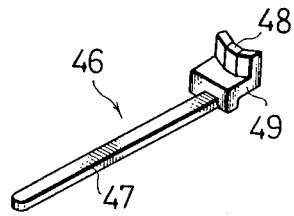

When the carriage 15 is delivered to the pen-selecting region S1 and the rod portion of the locking member 46 is brought into contact with the inclined part 55 and the engagement-releasing step 56 as shown in FIG. 9, the locking member 46 is pushed in a direction indicated by the arrow D against the resilient force of the helical spring 50, and as shown in FIG. 10, the engaging portion 49 of the locking member 46 is separated from the pen holding projection 32 to release the engagement therebetween and render the rotary drum 26 freely rotatable.

In this pen-selecting region S1, the ratchet 33 is freely engageable with the feed projection 41, and when the carriage 15 is delivered in the region S1 in a direction indicated by arrow A as shown in FIG. 5, the feed injection 41 is brought into abutting contact with the ratchet 33 to turn the ratchet 33 by one pitch corresponding to one tooth thereof in a direction indicated by arrow C. Accordingly, if the carriage 15 is driven in the direction A after it has been retracted in the direction B and if the ratchet 33, that is, the rotary drum 26, is rotated until the intended pen 34 arrives at the above-mentioned printing position, the operation of changing and selecting the pens 34 is accomplished. The pulse motor 19 for the delivery of the carriage 15 is utilized as the drive source for changing and selecting the pens 34, and the above operation of changing and selecting the pens 34 is accomplished by rotating the pulse motor 19 by a predetermined quantity in the normal or reverse direction. Accordingly, any particular drive source need not be independently disposed for change-over of the pens 34, and the change-over mechanism can be simplified and made compact.

In the drawings, reference numeral 42 represents a reverse rotation-preventing claw pressed to and engaged with the ratchet 33 by a spring 43. This claw 42 serves to prevent the ratchet 33 from rotating in the reverse direction when the projection 41 rides over the teeth of the ratchet 33 as the carriage 15 is moved in the direction B shown in FIG. 5.

As will be apparent from the foregoing description, according the the present invention, since selection of the appropriate printing pen, that is, selection of the color, is performed by rotating a rotary drum having a plurality of pens mounted thereon, the operation of selecting the predetermined pen can be accomplished very easily. Furthermore, since rotation of the rotary drum is performed by utilizing the drive source for delivery of the carriage, a drive source need not be independently disposed for performing the pen-selecting operation, and the color-changing mechanism can be simplified, with the result that the size and manufacturing cost of the printing device can be reduced. Moreover, rotation of the rotary drum is inhibited in the printing region by engaging means for determining the position of the rotary drum and the rotary drum is allowed to rotate only in the pen-selecting region, and therefore, desirable data can be recorded correctly and precisely.

What is claimed is:

1. A recording device for recording data in any of a plurality of colors, including a carriage having a rotary drum carrying a plurality of recording pens spaced around the periphery of said drum and capable of writing in respective colors, means for moving said carriage across the path of movement of a recording paper through a printing region opposite said recording paper and a pen-selecting region adjacent said printing region, pen-selection means for rotating said drum when said carriage is in said pen-selecting region to bring a selected pen into a printing position and for holding said drum against rotation when said carriage is in said printing region, and means carried by said carriage for urging the pen in said printing position outward into contact with said printing paper, said pen-selection means including a cam mounted for rotation with said drum and having a plurality of teeth engaged by a stationary projection during movement of said carriage in said pen-selecting region whereby said drum can be rotated to bring a selected pen into the printing position by reciprocating said carriage within said pen-selecting region.

2. A recording device as in claim 1, the means for holding said drum against rotation including a locking member carried slidably by said carriage and including an engaging portion biased against said drum to prevent if from rotating and means carried by said recording device for sliding said engaging portion away from said drum when said carriage is in said pen-selecting region.

3. A recording device as in claim 1, further including means carried by said carriage for allowing said drum to rotate in only one direction when said carriage is in said pen-selecting region.

* * * * *